United States Patent
Afshar et al.

(10) Patent No.: US 11,200,445 B2
(45) Date of Patent: Dec. 14, 2021

(54) DETERMINING VISUALLY SIMILAR PRODUCTS

(71) Applicant: Home Depot Product Authority, LLC, Atlanta, GA (US)

(72) Inventors: Estelle Afshar, Atlanta, GA (US); Matthew Hagen, Atlanta, GA (US); Huiming Qu, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 137 days.

(21) Appl. No.: 16/749,629

(22) Filed: Jan. 22, 2020

(65) Prior Publication Data

US 2021/0224582 A1    Jul. 22, 2021

(51) Int. Cl.
| G06K 9/62 | (2006.01) |
| G06Q 30/06 | (2012.01) |
| G06N 3/04 | (2006.01) |
| G06N 3/08 | (2006.01) |

(52) U.S. Cl.
CPC ......... *G06K 9/6215* (2013.01); *G06K 9/6202* (2013.01); *G06N 3/0454* (2013.01); *G06N 3/08* (2013.01); *G06Q 30/0623* (2013.01)

(58) Field of Classification Search
CPC ............................ G06K 9/6215; G06K 9/6202
See application file for complete search history.

(56) References Cited

U.S. PATENT DOCUMENTS

| 7,751,805 B2 | 7/2010 | Neven et al. |
| 8,805,116 B2 | 8/2014 | Lin et al. |
| 8,831,358 B1 | 9/2014 | Song et al. |
| 8,949,252 B2 | 2/2015 | Chittar et al. |
| 9,135,273 B2 | 9/2015 | Hirai et al. |
| 9,147,125 B2 | 9/2015 | Wang et al. |
| 9,449,026 B2 | 9/2016 | Wang et al. |
| 9,471,604 B2 | 10/2016 | Chittar et al. |
| 10,109,051 B1 * | 10/2018 | Natesh ................. G06K 9/4652 |

(Continued)

FOREIGN PATENT DOCUMENTS

WO    2017134519 A1    8/2017

OTHER PUBLICATIONS

Madislav Isaev, Building a reverse image search engine with convolutional neural networks, URL: https://blog.griddynamics.com/reverse-image-search-with-convolutional-neural-networks/, located via Google, Apr. 17, 2018, 5 pgs.

(Continued)

*Primary Examiner* — Tuan H Nguyen
(74) *Attorney, Agent, or Firm* — Greenberg Traurig, LLP

(57) ABSTRACT

A computer-implemented method for determining image similarity includes determining, by a first neural network, a first feature value associated with a first characteristic of a first product based on an image of the first product. The method also includes determining, by a second neural network, a second feature value associated with a second characteristic of the first product based on the image of the first product. The method further involves calculating a first vector space distance between the first feature value and a third feature value associated with the first characteristic of a second product, and calculating a second vector space distance between the second feature value and a fourth feature value associated with the second characteristic of the second product. Additionally, the method includes determining a similarity value based on the first vector space distance and the second vector space distance.

20 Claims, 6 Drawing Sheets

(56) References Cited

U.S. PATENT DOCUMENTS

| | | | |
|---|---|---|---|
| 2007/0143272 | A1 | 6/2007 | Kobayashi |
| 2015/0039583 | A1 | 2/2015 | Liu et al. |
| 2016/0125270 | A1 | 5/2016 | Gokturk et al. |
| 2016/0350336 | A1 | 12/2016 | Checka et al. |
| 2017/0249339 | A1 | 8/2017 | Lester |
| 2017/0262479 | A1 | 9/2017 | Chester et al. |
| 2018/0322208 | A1 | 11/2018 | Barrios Nunez et al. |
| 2018/0357258 | A1 | 12/2018 | Bu et al. |
| 2019/0251612 | A1 | 8/2019 | Fang et al. |
| 2019/0318405 | A1 | 10/2019 | Hu et al. |
| 2019/0354744 | A1* | 11/2019 | Chaloux ................ G06F 40/58 |

OTHER PUBLICATIONS https://webmasters.googleblog.com/2017/04/similar-items-rich-products-feature-on.html, Apr. 10, 2017, 4 pgs.

An Easier Way to Search eBay: Computer Vision with Find It On eBay and Image Search is Now Live, eBay News Team, https://www.ebayinc.com/stories/news/an-easier-way-to-search-ebay-computer-vision-with-find-it-on-ebay-and-image-search-is-now-live/, Oct. 25, 2017, 3 pgs.

Burgra, How We Created a Visual Search Engine for Hayneedle. com, https://medium.com/jettech/https-medium-com-jettech-visual-search-hayneedle-f248aa05f2f2, Feb. 19, 2019, 16 pgs.

ISA/US, Search Report and Written Opinion issued in PCT/US2021/014688, dated Apr. 13, 2021, 12 pgs.

Appalaraju et al., Image similarity using Deep CNN and Curriculum Learning. Jul. 13, 2018 (Jul. 13, 2018). [retrieved on Mar. 25, 2021], Retrieved from the Internet: <URL: https://arxiv.org/ftp/arxiv/papers/1709/1709.08761.pdf> pp. 1-9.

* cited by examiner

DETERMINING VISUALLY SIMILAR PRODUCTS

FIELD OF THE DISCLOSURE

The present disclosure generally relates to image classification techniques for determining visually similar products, to improve product recommendations displayed to a user on an e-commerce platform, for example.

BACKGROUND

Online e-commerce platforms (accessible through web sites, applications, and the like) typically offer product searching or browsing features, in which one or more products are displayed on a web page. Each product listing is often shown with an image, name, price, and/or availability of the product. On some platforms, a product listing also includes other product recommendations that may be relevant or otherwise of interest to the user based on the user's prior search history, the product listing itself, and/or other factors. In addition, many platforms offer search functionality to assist the user in locating products for purchase. Some e-commerce platforms with a wide selection of products can include filtering options to enable the user to narrow the search and find their desired products.

SUMMARY

According to one aspect of the present invention, there is provided a computer-implemented method for determining image similarity. The method involves determining, by a first neural network, a first feature value associated with a first characteristic of a first product based on an image of the first product. The method also involves determining, by a second neural network, a second feature value associated with a second characteristic of the first product based on the image of the first product. The method further involves calculating a first vector space distance between the first feature value and a third feature value associated with the first characteristic of a second product. Additionally, the method involves calculating a second vector space distance between the second feature value and a fourth feature value associated with the second characteristic of the second product. Further, the method involves determining a similarity value based on the first vector space distance and the second vector space distance. The method additionally involves displaying, on a user interface, a representation of the first product in association with the second product based on the similarity value exceeding a threshold value.

According to another aspect of the present invention, there is provided a computer-implemented method for determining image similarity. The method involves determining, by a first feature extractor, a first feature value associated with a first characteristic of a first product based on an image of the first product. The method also involves determining, by a second feature extractor, a second feature value associated with a second characteristic of the first product based on the image of the first product. The method further involves determining a first weighted vector space distance based on the first feature value, a third feature value associated with the first characteristic of a second product, and a predetermined weighting value. Additionally, the method involves determining a second vector space distance based on the second feature value and a fourth feature value associated with the second characteristic of the second product. Further, the method involves determining a similarity value based on the first weighted vector space distance and the second vector space distance. The method additionally involves displaying, on a user interface, a representation of the second product in association with the first product based on the similarity value exceeding a threshold value.

According to yet another aspect of the present invention, there is provided a system for determining visual similarity between images of products. The system includes a processor and a non-transitory, computer-readable memory storing instructions that, when executed by the processor, cause the processor to perform a method. The method involves determining, by a first neural network, a first feature value associated with a first characteristic of a first product based on an image of the first product. The method also involves determining, by a second neural network, a second feature value associated with a second characteristic of the first product based on the image of the first product. The method further involves calculating a first vector space distance between the first feature value and a third feature value associated with the first characteristic of a second product. Additionally, the method involves calculating a second vector space distance between the second feature value and a fourth feature value associated with the second characteristic of the second product. Further, the method involves determining a similarity value based on the first vector space distance and the second vector space distance. The method additionally involves determining that the first product and the second product are both associated with a product category based on the similarity value. The method further involves storing an indication that the first product is associated with the product category in a storage device.

The foregoing summary is illustrative only and is not intended to be in any way limiting. In addition to the illustrative aspects, embodiments, and features described above, further aspects, embodiments and features will become apparent by reference to the drawing figures, the following detailed description, and the claims.

DETAILED DESCRIPTION

Figure 1:
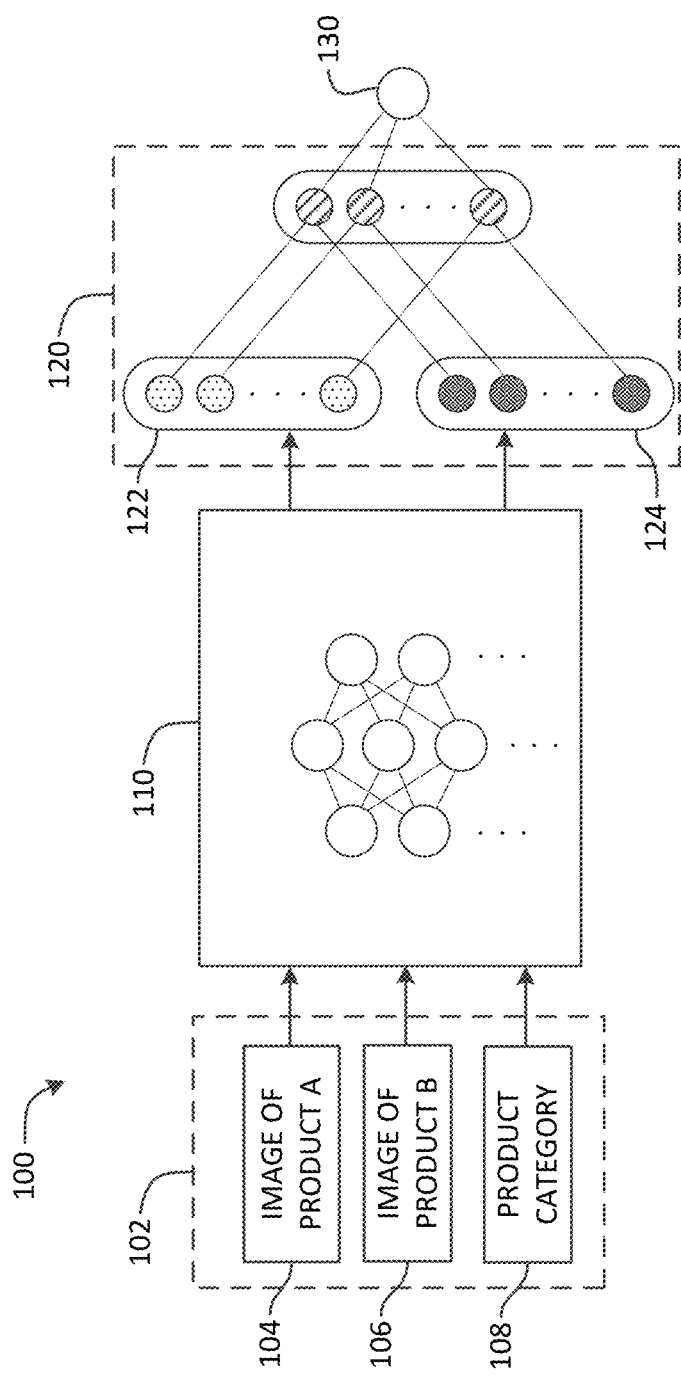
FIG. 1 is a block diagram illustrating an example model for determining similarity between two images of two respective products.

Image classification techniques are typically used to determine the category or categories to which an input image belongs. For example, convolutional neural networks (CNNs) for images include a series of layers that calculate kernel convolutions on pixel data to detect edges, corners, and shapes within an image, which may be used to classify the image. A typical CNN training process involves providing a set of labeled image samples to the CNN, comparing the predicted category for each data sample to its label, and tuning the weights of the CNN to better predict each data sample's label. It is desirable to train and validate a CNN, such that it predicts the category for data samples not within the training data set with a high degree of confidence—that is, with a high degree confidence that an input image both falls within a particular class and simultaneously does not fall within any other classes.

While image classifiers such as traditional CNNs are effective in some contexts, the performance of traditional CNNs (and neural networks, generally) can diminish as the complexity of a classification problem increases. For example, neural networks with a larger number of nodes and connections effectively consider more features of an image. In general, considering a higher number of features as a basis for classification can lead to a problem known as overfitting, in which a trained neural network performs well with respect to the training data, but does not generalize well to samples not within the training data. Thus, a challenge exists in balancing improving the degree of confidence in predicting an image's category or categories while simultaneously avoiding overfitting.

In the context of e-commerce platforms, it is desirable to provide functionality that displays relevant products to the user—such as within search results or through product recommendations related to a product selected by the user. For instance, a user may be browsing through an online catalog of products in search of a pendant lamp of a particular style. In this example, the user initially selects a dark-colored bowl-shaped industrial-styled pendant lamp. Unfortunately, an aspect of the lamp renders it unsuitable for the user's needs (e.g., the product is out of stock, the lamp is too large or too small, the price of the lamp exceeds the user's budget, etc.). However, the user is still interested in purchasing a pendant lamp of a similar visual appearance.

A known product recommendation technique involves matching one or more predetermined characteristics of the selected product with the respective characteristics of other products. This technique, however, can be ineffective when highly related visual styles are named differently. For example, an alternative "bowl" pendant lamp may be referred to as a "dome," "globe," or "cone" pendant lamp, any of which may be relevant to the user's interests. Likewise, suitable alternative dark-colored lamp may be black, brown, bronze, or another color, any of which may satisfy the user's preferences. Furthermore, the industrial style of the pendant may be considered to be "minimalist," "Scandinavian," "farmhouse," or "mid-century," even though the minor differences across these styles would be equally suitable to the user. Thus, finding related products by matching their predetermined characteristics may be unnecessarily narrow, possibly excluding visually similar products with different labels.

In addition, the present application contemplates that the bases for determining whether two products are visually similar may depend upon the type of product being compared. For instance, clickstream data collected on an e-commerce website may reveal that, for accent chairs, similarity in color is of greater significance than other factors (e.g., the style or patterning of the chair). However, for other product types, color may have lesser significance in determining visually similar products. For example, visually similar lamps may depend more on the style or shape, and less so on color. Thus, if a single off-the-shelf model, classifier, or neural network is used to determine whether two images represent visually similar products, the performance of that model may be suboptimal, as it would weight the different visual aspects for different types of products in a manner that does not accurately reflect the way in which users perceive visual similarity between products.

Various embodiments of the present disclosure address these challenges based on the realization that suitable alternatives for products of one type may depend on different characteristics than for products of another type. For example, chandeliers may be visually similar primarily based on their shape, and based less on any patterns present in the chandelier's design. In contrast, area rugs of the same shape may not necessarily be visually similar (e.g., because area rugs are usually rectangular), such that similarity between area rugs is largely influenced by its colors and patterning. Without correcting for these disparities in visual characteristic relevance, a product recommendation engine based on visual similarities between products may generate product recommendations with an undesirable number of poor recommendations (recommending products that are not visually similar according to customer perception) and/or false negatives (not recommending products that are visually similar).

From a machine learning perspective, the above-described problems may be considered deficiencies in traditional clustering techniques. In general, it is desirable for a clustering algorithm to identify a set of distinct and independent clusters of data points that each correspond with a respective class or category. If there are blurred or overlapping boundaries between neighboring clusters in a model, then the model may not be able to predict with sufficient confidence the class of an input data point. Aspects of the present disclosure address this problem by applying different weights to each metric or variable, so as to improve the separation (in vector space) between distinct clusters. The weighting values may be determined based on data (e.g., clickstream data collected on an e-commerce platform), or manually designated by a developer, administrator, or other human operator.

As described herein, the terms "neural network," "classifier," "feature extractor," and "model" may generally refer to a computational model configured to convert information from an input form (e.g., pixel data) to an output form (e.g., feature values, classifications, confidence values, etc.). The particular machine learning tools or models used may vary among implementations, depending upon the particular task, the type of data being processed, and other factors. It will be appreciated that any description of a particular type of model (e.g., a convolutional neural network) is provided for explanatory purposes, and that suitable alternative tools or models may also be used.

As described herein, a "similarity value" may refer to any metric representative of a degree of similarity between two images or products. For example, a distance metric in vector space (e.g., Euclidean distance, cosine distance, etc.) between two embeddings may be indicative of a degree of similarity between the two images from which the embeddings were generated. The similarity value may be a distance metric, or may be determined based on a calculated distance metric using any combination of mathematical operations, probability distributions, and/or other computations.

An example e-commerce platform may include one or more frontend systems (e.g., for generating web pages in a web browser and/or user interfaces in an application) that communicate with one or more backend systems (e.g., servers or other data sources from which user interfaces are generated, search engines, and other processing) that collectively provide a website, application, or other electronic platform that presents a merchant's product offerings to users and enables users to shop or browse those product offerings. The backend systems may include some combination of databases, relationships, and logic to provide information about the products to the frontend systems for display to the user.

An example backend system may store information about products in a catalog offered by a merchant or retailer. Product information may include a name, brand, price, specifications, product number (such a manufacturer number and/or a merchant-specific number), an image or images of the product, and/or other information. Such a product catalog backend system may be queried in order to generate web pages on the e-commerce platform, such as a product search result web page—which may include information respective of numerous products and/or product types that are responsive to a user search on the platform—or a product information web page, which may include information respective of a single product, among other possible web pages. Such an e-commerce platform will be discussed as an example implementation of the novel visually similar product recommendation methodology of the instant disclosure, but numerous other implementations are possible and contemplated.

Referring to the drawings, wherein like numerals refer to the same or similar features in the various views, FIG. 1 is a block diagram illustrating an example classification system 100 for determining an extent to which two images of two respective products are visually similar.

The classification system may include an input stage 102, a network stage 110, a comparison stage 120, and an output stage 130. The input stage 102 may include an image 104 of product A, an image 106 of product B, and a product category 108, among other possible information or data. The network stage 110 receives data from the input stage 102 and generates a pair of embeddings 122 and 124, with the embedding 122 including a vector of feature values associated with the image 104 of product A, and the embedding 124 include a vector of feature values associated with the image 106 of product B. The embeddings 122 and 124 may each be a quantitative representation of one or more visual or aesthetic qualities of its respective image (e.g., color, shape, pattern, style, etc.). At the comparison stage 120, the embeddings 122 and 124 may be compared or otherwise evaluated to calculate a distance metric between the embeddings 122 and 124 in the feature vector space. The calculations performed at the comparison stage 120 may then serve as the basis for the output stage 130, to output an extent to which the image 104 of product A and image 106 of product B are visually similar, and/or to serve as inputs into additional processes (e.g., product relevancy ranking, product recommendation engines, automated placement of products into a catalog or taxonomy, etc.).

The image 104 of product A and the image 106 of product B may be images of products being compared. In some instances, it may be desirable to compare similar views of products A and B from the same or similar angle or perspective in order to control for visual differences attributable to differences in perspective rather than differences in the aesthetic qualities of the products themselves. Where the images 104 and 106 are of different resolutions, or have resolutions that are incompatible with the network stage 110, the image 104 and/or the image 106 may be processed to normalize their resolutions. Pixel data from the images 104 and 106 may then be provided as inputs to the network stage 110 for processing.

The product category 108 may be any representation of a category or categories to which the image 104 of product A and/or the image 106 of product B belongs. The product category 108 may be an indication of a type of product (e.g., an area rug, an accent chair, a chandelier, etc.), rather than aspects of that product (e.g., brand, dimensions, color, etc.). The level of granularity between product categories may vary among implementations, and may depend on factors such as the size of a retailer's catalog, the computing resources used to implement the classification system 100, the amount of training data available with which to configure the classification system 100, and/or decisions made by an expert or administrator. The product category 108 may be associated with a respective set of weightings, which may augment the network stage 110 by modulating the extent to which different aesthetic qualities influence the visual similarity determination.

The network stage 110 may include any combination of neural networks or classifiers configured to generate the pair of embeddings 122 and 124 associated with the images 104 and 106, respectively. As one example, the network stage 110 may include a deep convolutional neural network (CNN), which separately processes image 104 and image 106 (e.g., using the same node connection weights) and separately generates the embeddings 122 and 124. As another example, the network stage 110 may include multiple independent neural networks that are each trained to quantify a different aesthetic quality or qualities and output a feature value or set of feature values that form a portion of an embedding. In other implementations, the network stage 110 may include any combination of classifiers or feature extractors suitable to quantify the aesthetic qualities of an input image. The network stage 110 is described in greater detail below with respect to FIG. 2.

At the comparison stage 120, the classification system 100 compares the embedding 122 and the embedding 124 to determine the extent to which the image 104 and the image 106 are visually similar. In an example implementation, a cosine similarity calculation (see Equation (1) below) may be used to measure a cosine distance between the embeddings 122 and 124 in vector space. Other measures of distance between embeddings in vector space—such as the Euclidean distance, the rational basis kernel function, the Chebyshev distance, and/or other suitable distance metrics—may be used to compare the embeddings 122 and 124 to determine the visual similarity between the images 104 and 106.

$$\cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad (1)$$

The output stage 130 may process information received from the comparison stage 120, such as a distance measurement between the embeddings 122 and 124, to determine an extent to which the image 104 of product A and the image 106 of product B are visually similar. In some cases, the output stage 130 performs no additional computations, and simply transmits the distance metric to other systems for subsequent processing and/or storage. Alternatively, the output stage 130 may perform computations to normalize the distance metric (e.g., where the distance metric itself is not normalized). In some implementations, the distance metric received from the comparison stage 120 may be processed by the output stage 130 to determine a confidence level, such as by determining the location of the distance metric on a probability distribution, by determining a confidence interval associated with a range of distances within which the determined distance metric falls, or by determining whether the distance metric is above or below a threshold distance (e.g., if the distance metric is below a threshold distance, then the images exceed a threshold level of visual similarity).

In addition, the output stage 130 may provide information to downstream processes associated with the operation of an e-commerce platform. For instance, an e-commerce platform may generate a set of product recommendations relative to a particular product containing products that are visually similar to that particular product. An example process may involve comparing one or more images of the particular product with one or more respective images for each product in a set of other products using the classification system 100. For example, an image of the particular product and an image of a candidate product from the same or similar perspective may be compared using the classification system 100 to assess their visual similarity. Each potentially recommendable product may be determined to be some distance (e.g., cosine distance) from the particular product. As a specific example, the e-commerce platform may sort the potentially recommendable products in descending order based on their respective distances to the particular product, such that the ordered list of recommendable products is displayed from the most visually similar product to the least visually similar product. In some cases, the e-commerce platform may select a subset of the potentially recommendable products that are within a threshold distance, and/or may select a predetermined number of potentially recommendable products to display as recommended or similar products (e.g., the five most visually similar products).

Figure 2:
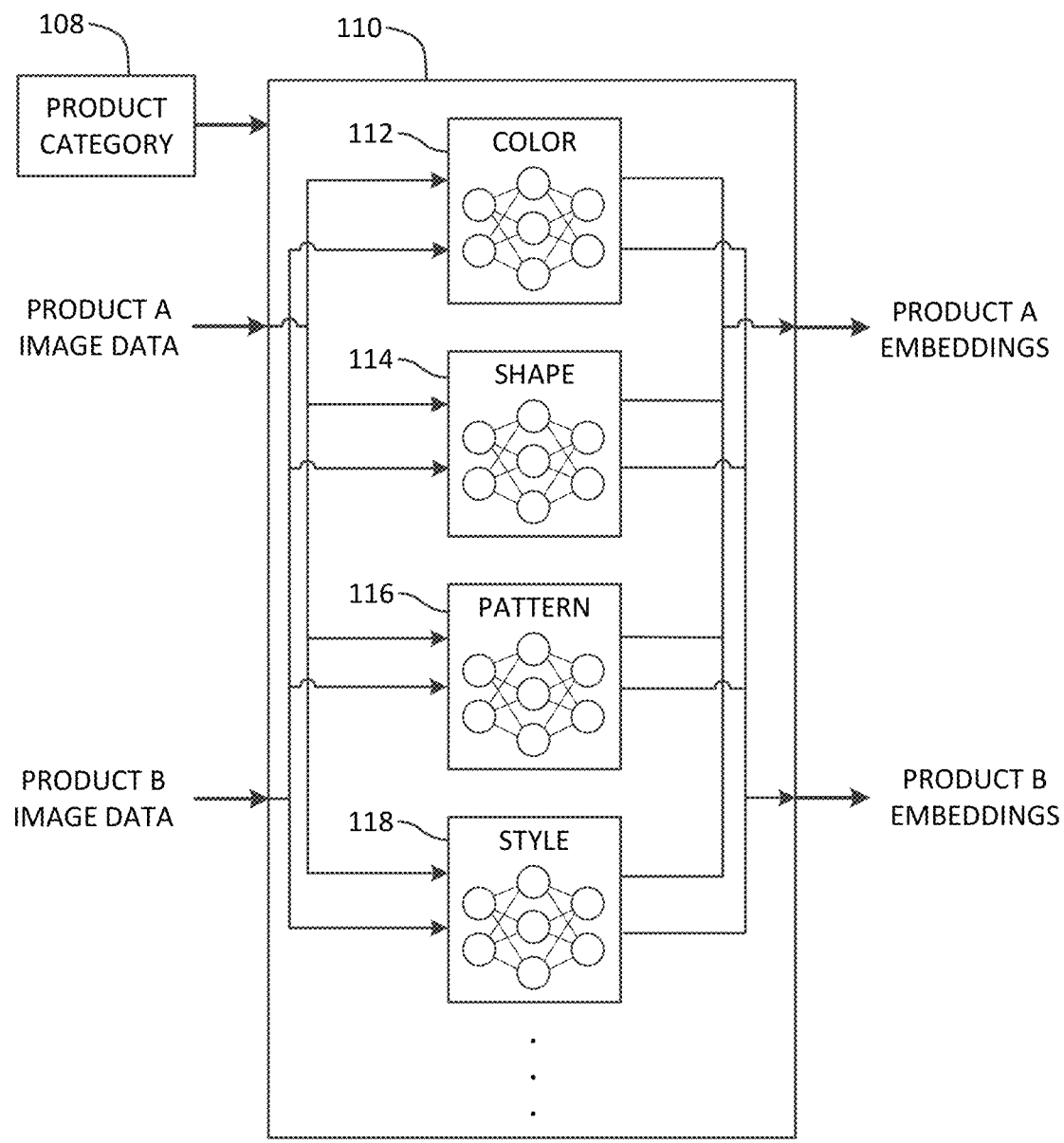
FIG. 2 is a block diagram illustrating an example neural network configuration for determining similarity between two images of two respective products.

FIG. 2 illustrates a block diagram of an example network stage 110. In this example, the network stage 110 receives as inputs image data (e.g., pixel information) of products A and B, along with an indication of the category of products A and B. The example network stage 110 includes multiple separate feature extractors, including a color feature extractor 112, a shape feature extractor 114, a pattern feature extractor 116, and a style feature extractor 118—each of which receive the image data of products A and B. Each feature extractor may be any type of dimensionality-reducing machine learning tool, such as neural networks, support vector machines (SVMs), kernel functions, feature transformations, and/or any other suitable processing structure that converts input data into one or more scalar values that quantitatively represent an aesthetic quality or qualities of the input image data.

For example, the color feature extractor 112 may generate one or more values representative of the color or colors present within the image. The number of feature values output by the color feature extractor 112 may vary among implementations. As a specific example, a color feature extractor 112 may generate multiple independent color channel values that represent the average color of the image. In other examples, it may be difficult to associate each feature value vector with an analogous real-world metric, such as when the color feature extractor 112 is a neural network. Regardless of the implementation, the color feature extractor 112 may be designed, trained, or otherwise configured to generate feature values representative of the colors of an input image.

Similarly, the shape feature extractor 114, the pattern feature extractor 116, and the style feature extractor 118 may generate one or more values representative of the shapes, patterns, and or style of the product based on input image data. The shape feature extractor 114, for example, may include a convolutional neural network (CNN) that carries out kernel operations to perform edge and/or corner detection (or any other suitable feature extraction model) and generate feature values indicative of the edges present within an input image (e.g., the locations of edges in the input image). The pattern feature extractor 116 may also include a CNN or the like that performs pattern detection, and generates feature values indicative of the patterns present within an input image. Likewise, the style feature extractor 118 may be any type of machine learning tool (e.g., a CNN, SVM, etc.) that receives input image data and generates one or more feature values that collectively represent the style of a product shown in the input image.

In some embodiments, one or more of the color feature extractor 112, the shape feature extractor 114, the pattern feature extractor 116, and style feature extractor 118 may receive, in addition to the image data of products A and B, the product category 108. Each feature extractor configured to receive the product category 108 may be trained to generate different feature value outputs for different product categories—to effectively cause the feature extractor to modulate or weight the feature values according to the product category 108.

In some embodiments, the product category 108 may be associated with predetermined weighting values, which may be applied to the outputs of the color feature extractor 112, the shape feature extractor 114, the pattern feature extractor 116, and style feature extractor 118. For example, the classification system 100 may access or have stored therein a table, database, or other data storage element that associates one or more product categories with respective sets of feature weights. As a simple example, the product category for area rugs may be associated with weight values of (color=0.75, shape=0.03, pattern=0.67, style=0.08). In this example, the color feature value or values output by the color feature extractor 112 may be multiplied by 0.75, the shape feature value or values output by the shape feature extractor 114 may be multiplied by 0.03, the pattern feature value or values output by the pattern feature extractor 116 may be multiplied by 0.67, and the style feature value or values output by the style feature extractor 118 may be multiplied by 0.08. These example feature weights may have the effect of increasing the relative impact of color and pattern differences in the cosine distance between the embeddings 122 and 124 of products A and B, respectively, while also decreasing the relative impact of the shape and style differences in the cosine distance between the embeddings 122 and 124 of products A and B, respectively. As a result, images of two area rugs that vary in style (e.g., modern, traditional, Bohemian, mid-century, etc.), but have a highly similar color and pattern may produce weighted embeddings that are a shorter cosine distance away from each other in vector space, compared to the cosine distance between unweighted embeddings.

In other embodiments, the product category 108 may be associated with predetermined weighting values, which may be applied at the comparison stage 120 to modulate or otherwise alter the distance between embeddings of a particular visual quality. For example, the comparison stage 120 may initially determine a cosine similarity value between the embeddings derived from the patterns in the image 104 of product A and the embeddings derived from the patterns in the image 106 of product B. The determined cosine similarity value may then be multiplied by the predetermined weighting value associated with the "pattern" visual quality.

This weighted or scaled pattern similarity value may more accurately reflect the relative significance that customers consider in assessing visual similarity based on the pattern of products within the product category 108.

In some implementations, the feature weighting values associated with product categories may be generated using parameter optimization techniques, such as Bayesian parameter optimization. Clickstream data and/or user behavior data collected on an e-commerce platform may include search and browsing patterns from users that are indicative of visually similar products. For instance, a user may conduct a search, and click on a few of the products of interest that appear in the product search page. In addition, a user viewing a particular product on a product listing page may subsequently click on one or more other products that appear on the product listing page, such as product recommendations, products that others have viewed or purchased in association with the particular product, and/or other links to related products. Such user behavior data may be analyzed to determine product associations that may be indicative of products that users consider to be visually similar. For décor products, such as furniture, lighting, and art, user clickstream data may represent patterns of behavior indicative of products that users consider to be suitable alternatives and/or having a similar visual style.

For example, clickstream data and/or user behavior data may reveal that the color of an accent chair is nine (9) times more significant in assessing visual similarity than the shape of the accent chair. In other words, the cosine distance between the color of accent chairs should be more sensitive to differences in color (e.g., by a factor of nine) relative to the cosine distance between the shape of accent chairs. In this example, a weighting value of 0.9 may be applied to the cosine distance between the color value embeddings, while the cosine distance between the shape value embeddings is weighted by 0.1. Other weighting values are also possible.

More generally, an example technique for deriving weighting values from clickstream data may involve initially calculating cosine similarity values for each visual characteristic (e.g., shape, style, pattern, etc.). Hyperparameter optimization may be used to determine a "stock" set of weighting values to apply to the cosine similarity values of each visual quality. Using this initial set of weighting values, a particular product may be compared against a set of other products in the same product category, to determine a set of similarity scores and enable the identification of the most visually similar products. The extent to which the most visually similar products have overlapping visual similarity scores may be indicative of the relative significance of each visual quality in determining visual similarity between products in that product category. For example, if a set of related accent chairs have highly similar color similarity values, then the weighting of color similarity may be increased relative to the weighting of other visual qualities. As another example, if the set of related accent chairs have widely varying shape similarity values, then the weighting of shape similarity may be decreased relative to the weighting of other visual qualities. Once a desired level of precision is achieved, the weighting values for the product category may be stored and used in subsequent visual similarity determinations.

In some implementations, the feature weights may be designated by an end user by way of input controls on an e-commerce platform's web site. An example web page may include, for example, a user interface with one or more input controls (e.g., input boxes, buttons, sliders, dials, etc.) that enable a user to modify the weightings for one or more visual characteristics. For instance, a product search page, a product listing page, and/or another web page on an e-commerce platform may include configurable elements—such as sliders that allow users to specify a number between 0 and 1, which corresponds with a feature-specific weighting value for an aesthetic characteristic, such as color, shape, pattern, or style.

In some embodiments, an e-commerce platform may provide a web page for searching for products that are visually similar to an anchor product. The web page may allow the end user to tune one or more feature-specific weighting values, which may affect the products and/or the order of products being displayed in a list, grid, or the like. In some implementations, the web page may responsively adjust the products being displayed and/or the order in which the products are displayed in a list when the user modifies a feature-specific weighting value input element. The web page may refresh, or otherwise dynamically create and/or update the list of products to display when feature-specific weighting values are changed.

Continuing with the above example, an unweighted network stage 110 may generate product embeddings for three products: (1) a gray contemporary indoor/outdoor area rug with a white Moroccan trellis, (2) a gray shaggy mid-century area rug with a white Moroccan trellis, and (3) a slate colored shaggy area rug with a geometric pattern. Without applying any weighting, the network stage 110 may generate product embeddings based on images of the three area rugs, which in vector space are approximately separated by the same cosine distance, with the cosine distance between products (1) and (2) being approximately equivalent to the cosine distance between products (2) and (3). However, it may be the case that products (1) and (2) are considered to be highly visually similar based on user behavior data. Appropriate feature weights may be determined—manually, computationally, or otherwise—such that the visual similarity between products (1) and (2) is more accurately reflected in the embeddings output by the network stage 110.

The network stage 110 and/or other aspects of the classification system 100 may collectively form a Siamese neural network, or a neural network that receives a pair of input samples and outputs a respective pair of vectors or embeddings, applying the same neural network(s) to both input samples. The Siamese neural network may be trained using triplet training data, with each training data sample containing an anchor image, a positive image of the same class as the anchor image, and a negative image of a different class than the anchor image. Preferably, the training data samples include positive image samples that produce embeddings that are a further distance from the anchor image as that of the negative image, such that differences between the untrained network(s) output and the ground truth can be corrected.

In some implementations, the network stage 110 may include a single neural network, rather than multiple independent neural networks. For example, a CNN may be a deep neural network having multiple layers, including an input layer that receives pixel data of an image, one or more convolutional layers, and one or more activation or rectifier layers. The convolutional layers may each apply a filtering or kernel operation to the pixel data, to in turn generate nodes representative of colors, edges, corners, shapes, and/or higher levels of abstraction (e.g., combinations of shapes, patterns, styles, etc.). For example, the first convolutional layer may apply a kernel function to perform edge detection on the input layer. A subsequent convolutional layer may then pool nodes from the edge detector, and/or apply other operations to the edge detection nodes to perform corner detection. Accordingly, at each stage in the network, one or more nodes may correspond to a particular type of aesthetic feature. In some embodiments, the feature extractors shown in FIG. 2 may read out the node values in a typically hidden layer, as the hidden layers of the CNN may effectively serve as feature extractors. The CNN may or may not include a maximum pooling or fully connected layer, as the CNN would not be used to perform the final step of classifying the input sample.

Although FIG. 2 is shown and described as having feature extractors associated with color, shape, pattern, and style, it will be appreciated that a variety of aesthetic or visual qualities may be extracted and measured from input data. The particular visual metrics used may vary among different applications. The particular examples described herein are provided for explanatory purposes, and do not limit the scope of the present disclosure.

Figure 3:
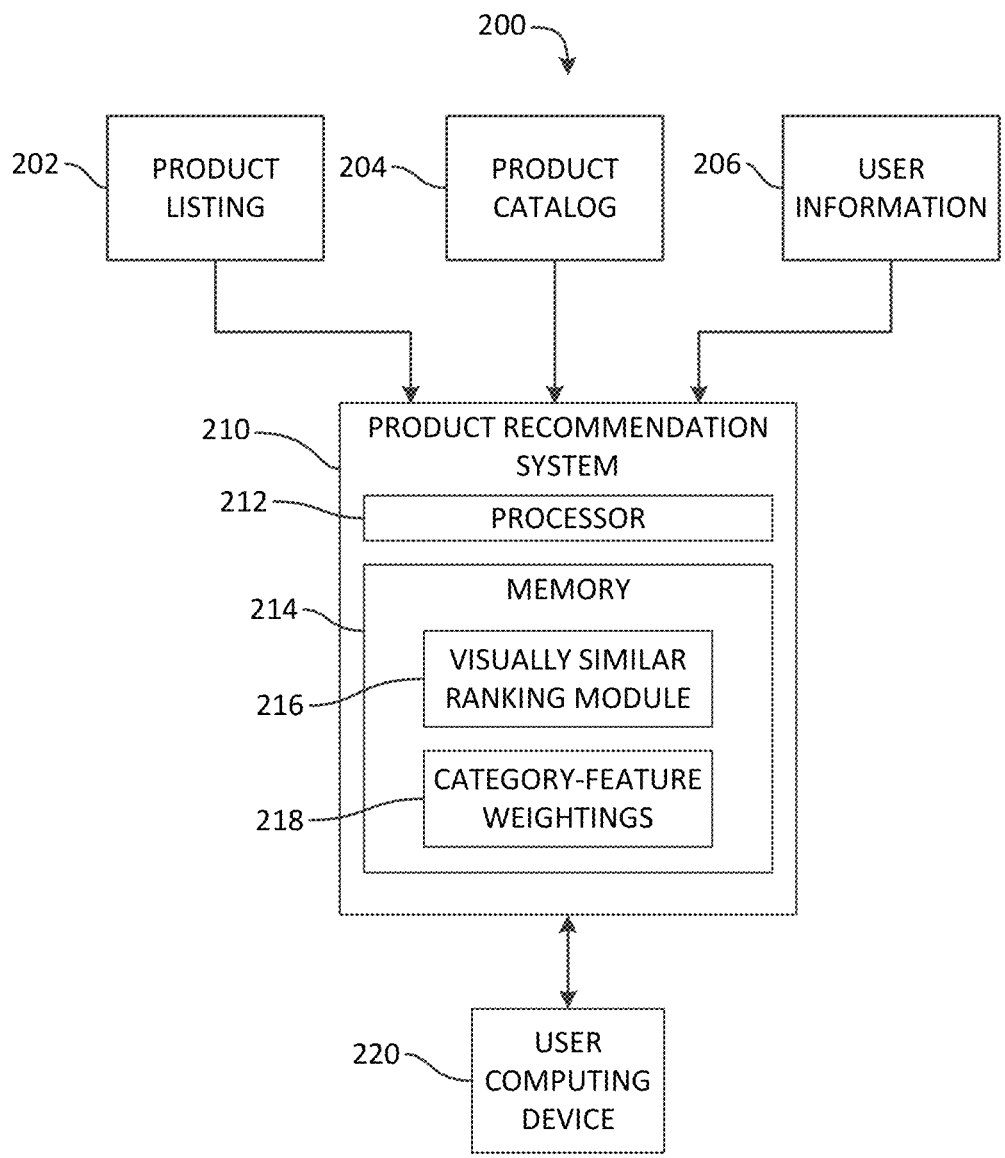
FIG. 3 is a block diagram illustrating an example system for generating and displaying product recommendations.

FIG. 3 is a block diagram illustrating an example system 200 for generating and displaying product recommendations. The system 200 may include an electronic repository of a product listing 202, an electronic repository of a product catalog 204, an electronic repository of user information 206, and a product recommendation system 210. The product recommendation system 210 may include a processor 212 and a non-transitory, computer-readable memory 214 storing instructions that, when executed by the processor 212, cause the processor 212 to perform one or more steps, methods, algorithms, or other functionality of this disclosure. The instructions in the memory 214 may include one or more functional modules, such as a visually similar ranking module 216 and category-feature weightings 218. The repository of the product listing 202, repository of the product catalog 204, and repository of user information 206 may each be embodied in one or more non-transitory computer-readable memories, such as one or more databases, for example.

The product listing 202 may include, in some embodiments, information respective of a particular product, such as a product offered by sale by a retailer. Such a product may be offered for sale through online sales and/or sales in brick-and-mortar stores. Information about the product may include a product category, (e.g., by category and one or more sub-categories), a product name, product brand, textual product description, one or more product features or functions, one or more images or videos associated with the product, and/or other information. The product listing 202 may comprise, in embodiments, a product information page that is displayable to a user on an e-commerce website when the user selects the product. Accordingly, the product listing 202 may include product information that is used as source data for populating an e-commerce website, in some embodiments.

The product catalog 204 may include inventory information for some or all of the products in a retailer's catalog. The product catalog 204 may include any of the information related to products other than the particular product of the product catalog 204, such as the product described above with respect to the product listing 202. The product catalog 204 may, in some cases, include a subset of products from a retailer's entire catalog that share a common feature, category, or is otherwise related to the particular product in the product listing 202. The product catalog 204 may include one or more images associated with each product, which may be compared with a respective image or images of the particular product in the product listing 202 to determine the extent to which the products are visually similar.

In some cases, a product in the product catalog 204 may include two or more images of the product, taken from different viewpoints or angles (e.g., front, rear, perspective, etc.). When comparing products to determine the extent to which they are visually similar, it may be desirable to compare images of respective products that are each captured from the same or similar viewpoint or angle. In some instances, the images of products in the product catalog 204 may be labeled or tagged with information indicating the viewpoint or angle from which the image as captured. The product recommendation system 210 may select images from the product catalog 204 that have the same or similar viewpoint or angle as that of the image of the product of the product listing 202, to reduce the likelihood that visual differences attributable to different viewpoints or angles adversely impact the visual similarity determinations.

In some embodiments, the classification system 100 and/or a related system may be configured to determine and/or label images according to the perspective or angle from which an image of a product was captured. As an example, the product recommendation system 210 may determine the perspective or angle from which each image from the product catalog 204 was captured, compare the perspective or angle with that of the image of the product for the product listing 202, and select images for comparison that share the same or a common viewpoint or angle. In some examples, the display of visually similar products (e.g., as product recommendations relative to a particular product) may involve selecting representative images of the visually similar products that have the same or similar viewpoint or angle as that of a representative image of an anchor product.

The user information 206 may include information respective of one or more users of an e-commerce website, mobile application, or other interface with which the product recommendation system 210 is associated. The user information 206 may include, for example, respective user profile information provided explicitly by one or more users, or learned based on the user's clickstream data and/or shopping history. In some implementations, the user information 206 may further augment the determination of the extent to which two products are visually similar by, for example, adjusting the feature weightings on a user-by-user basis. For example, one user may have a history of viewing and/or purchasing décor products of a particular color or color scheme, such that the weighting applied to the color feature values may be increased (and/or the weighting for other feature values decreased). Additionally, the user information 206 may store particular preferences expressly indicated by the user in setting up a user profile, which may affect the visual similarity determinations made relative to that user.

The product recommendation system 210 may be in electronic communication with one or more user computing devices 220. The product recommendation system 210 may receive the product listing 202 selected for viewing on the user computing device 220, and generate one or more recommended products from the product catalog 204 to display in association with the product listing 202 on a product listing page. In various examples, the product recommendation system 210 may select products from the product catalog that are frequently viewed or purchased by other users in connection with the product listing 202, select other products that have attributes in common with the particular product of the product listing 202, and/or select other products that are visually similar to the particular product of the product listing 202, among other possible product recommendations. The product recommendation system 210 may also sort, rank, or otherwise designate an order with which to display a set of selected product recommendations, based on their potential relevance to the user and/or based on the degree of visual similarity of the recommended products with respect to the product listing 202. The remainder of this disclosure will be described with reference to an embodiment where the product recommendation system 210 selects and/or ranks products to display with the product listing 202 based on their visual similarity to the particular product, but such description is by way of example only. The product recommendation system 210 may be implemented as part product listing display module that dynamically generates the content to display on a product listing web page viewable on the user computing device 220.

The visually similar ranking module 216 may include the classification system 100 described above with respect to FIG. 1, and/or may include one or more neural networks, classifiers, and/or other models such as those described above with respect to FIGS. 1 and 2. The visually similar ranking module 216 may perform techniques described herein to generate, for a set of products from the product catalog 204, a respective set of distances, confidence intervals, and/or scores indicative of the degree of visual similarity between each product and the particular product of the product listing 202. As a specific example, the visually similar ranking module 216 may generate cosine similarity values between zero and 1, representing the cosine distance between each product and the particular product of the product listing 202. The visually similar ranking module 216 may then sort the set of products according to the respective set cosine similarity values (e.g., in descending order, among other ordering criteria). The product recommendation system 210 may, according to an example embodiment, cause the product listing page for the particular product to display recommended products, in order from most visually similar to least visually similar.

Additionally, and/or alternatively, the product recommendation system 210 may combine the outputs from the visually similar ranking module 216 with other factors in providing product recommendations. For example, a previously determined set of recommended products may be altered or reordered based on visual similarity determinations made with respect to each of those products. As another example, the product recommendation system 210 may generate a list of recommended products that includes some visually-similar products (e.g., within a threshold level of visual similarity) and other related products.

The category-feature weightings 218 may be any electronic repository, database, table, data file, and the like which stores predetermined feature weight values with a respective set of product categories. For example, the category-feature weightings 218 may be a database, with each entry including a product category, a weighting for color feature values, a weighting for shape feature values, a weighting for pattern feature values, and a weighting for style feature values. The category-feature weightings 218 may be retrieved, queried, or otherwise accessed by the visually similar ranking module 216 in performing visual similarity determinations according to the present disclosure. An example table of the category-feature weighting 218 is provided below as Table 1, for explanatory purposes.

TABLE 1

| | Category | | | |
| | Color Weight | Shape Weight | Pattern Weight | Style Weight |
|---|---|---|---|---|
| Chandelier | 0.52 | 1.0 | 0.02 | 0.14 |
| Wallpaper | 0.67 | 0.01 | 0.41 | 0.15 |
| Area Rug | 0.75 | N/A | 0.67 | 0.08 |
| Ottoman | 0.22 | 0.89 | 0.09 | 0.50 |
| Accent Chair | 0.42 | 0.65 | 0.17 | 0.43 |

In some cases, a particular visual characteristic may be omitted from the visual similarity determination process. For example, area rugs may be, by definition, generally rectangular in shape. Thus, the degree of similarity between the shapes of two area rugs may not be considered in determining the extent of visual similarity between the two area rugs. Table 1 reflects this case, in which the weighting value for the shape visual quality is "N/A" for the Area Rug product category.

The user computing device 220 may be, in embodiments, a personal computer, mobile computing device, and the like. The user computing device 220 may be operated by a user of the website or other interface with which the product recommendation system is associated. The user computing device 220 may be configured to provide information to the product recommendation system 210, such as user behavior data, a user's location, and/or other information.

As described above, the category-feature weightings 218 may be user-designated feature weightings, based on one or more inputs provided by a user on a web page, application, or the like. For example, slider input elements displayed on a retailer's website may enable users to specify one or more visual characteristic-specific weightings indicative of the user's preferences for what is considered to be visually similar. The user computing device 220 may display input elements (e.g., on a mobile application, web page, or the like), with which the user can specify and/or modify the category-feature weightings 218. Upon the user's input or modification of one or more of the category-feature weightings 218, the visually similar ranking module 216 and/or the product recommendation system 210 may responsively modify, alter, or otherwise update a display of recommended or visually similar products in real time or near-real time.

Figure 4A:
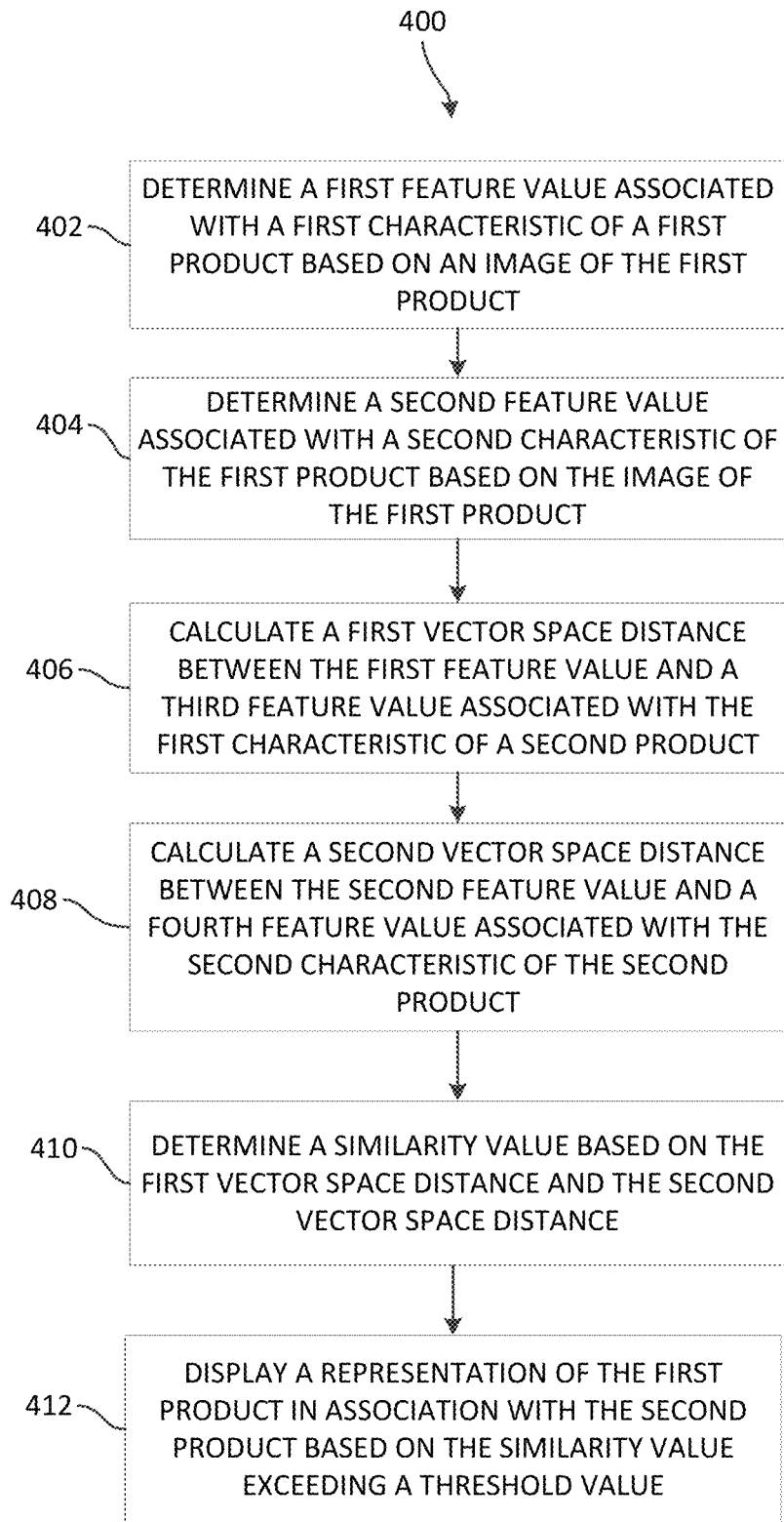
FIG. 4A is a flow chart illustrating an example method for determining image similarity.

FIG. 4A is a flow chart illustrating an example method for determining image similarity. The method 400, or one or more portions thereof, may be performed by the classification system 100 of FIG. 1, in some embodiments.

The method 400 may include a step 402 that includes determining, by a first neural network, a first feature value associated with a first characteristic of a first product based on an image of the first product. The first feature value may be a quantitative representation of the first characteristic—such as the color, shape, pattern, and style of the first product, as depicted in the image of the first product. The first neural network may be configured to receive pixel data of the image of the first product, and to perform operations to reduce the dimensionality of the input data to produce one or more outputs representative of the first characteristic.

The method 400 may also include a step 404 that includes determining, by a second neural network, a second feature value associated with a second characteristic of the first product based on the image of the first product. The second feature value may be a quantitative representation of the second characteristic—such as the color, shape, pattern, and style of the first product, as depicted in the image of the first product. Similar to the first neural network, the second neural network may be configured to receive pixel data of the image of the first product, and to perform operations to reduce the dimensionality of the input data to produce one or more outputs representative of the first characteristic.

In some embodiments, the first and second neural networks may be specifically configured to extract features associated with substantially independent characteristics or aesthetic qualities. For example, the first neural network may be configured to extract color information from an input image, while the second neural network performs convolution operations to detect edges, corners, and/or shapes present in an input image.

The method 400 may further include a step 406 that includes calculating a first vector space distance between the first feature value and a third feature value associated with the first characteristic of a second product. In some embodiments, the third feature value may have been previously determined using the first neural network, and subsequently stored on a storage device. In other embodiments, the third feature value may be determined using the first neural network based on an image representative of the second product. In various implementations, the first feature value and/or the third feature value may be embeddings that are each a collective quantitative representation of aesthetic features of the first product and the second product, respectively.

As described in greater detail above, the first feature value and/or the third feature value may be weighted, based on a set of category-specific weights. Accordingly, the step 406 may additionally involve weighting the first feature value and/or the third feature value to generate the first vector space distance. The weighting operation may be performed by the first neural network, or may involve separate calculations performed on the feature values output by the first neural network. In some embodiments, the first vector space distance may first be determined based on the first feature value and the third feature value, and subsequently weighted using a predetermined, pre-calculated, or user-specified weighting value, which may be associated with a particular product category, for example.

The method 400 may also include a step 408 that includes calculating a second vector space distance between the second feature value and a fourth feature value associated with the second characteristic of the second product. In some embodiments, the fourth feature value may have been previously determined using the second neural network, and subsequently stored on a storage device. In other embodiments, the fourth feature value may be determined using the second neural network based on an image representative of the second product. In various implementations, the second feature value and/or the fourth feature value may be embeddings that are each a collective quantitative representation of aesthetic features of the first product and the second product, respectively.

As described in greater detail above, the second feature value and/or the fourth feature value may be weighted, based on a set of category-specific weights. Accordingly, the step 408 may additionally involve weighting the second feature value and/or the fourth feature value to generate the second vector space distance. The weighting operation may be performed by the second neural network, or may involve separate calculations performed on the feature values output by the second neural network. In some embodiments, the second vector space distance may first be determined based on the second feature value and the fourth feature value, and subsequently weighted using a predetermined, pre-calculated, or user-specified weighting value, which may be associated with a particular product category, for example.

The method 400 may additionally include a step 410 that includes determining a similarity value based on the first vector space distance and the second vector space distance. The similarity value may, in some implementations, be a distance metric between the first vector space distance and the second vector space distance in vector space (e.g., cosine distance, Euclidean distance, Chebyshev distance, etc.). In other instances, multiple distance metrics may be determined, each corresponding to a distance in vector space between feature values of the same visual quality (e.g., comparing the pattern feature value or values of one product with the pattern feature value or values of another product). In other implementations, a distance metric may serve as the basis for determining the similarity value. For example, the distance metric may be normalized, discretized, or otherwise modified to generate the similarity value.

In addition, the method 400 may include a step 412 that includes displaying, on a user interface, a representation of the first product in association with the second product based on the similarity value exceeding a threshold value. In some examples, the similarity value may be used by an e-commerce platform to determine whether or not to display a product from a catalog as a recommended product in association with a particular product. In other examples, multiple similarity values may be calculated for a set of potentially recommendable or visually similar products. The similarity values respective of the set of products may be used to sort, order, and/or rank the set of products from most relevant or visually similar, to least relevant or visually different.

In various embodiments, the method 400 may also involve using the similarity value as a basis for categorizing the first product. For example, a retailer may wish to determine an appropriate category or categories with which to associate the first product. The similarity value may be used to predict the location of the first product in the feature vector space, which may be associated with one or more categories or one or more particular products. For instance, the similarity value may indicate that the first product and the second product are highly similar. In this instance, one or more of the categories with which the second product is associated may form the basis for selected a category or categories to associate with the first product.

Figure 4B:
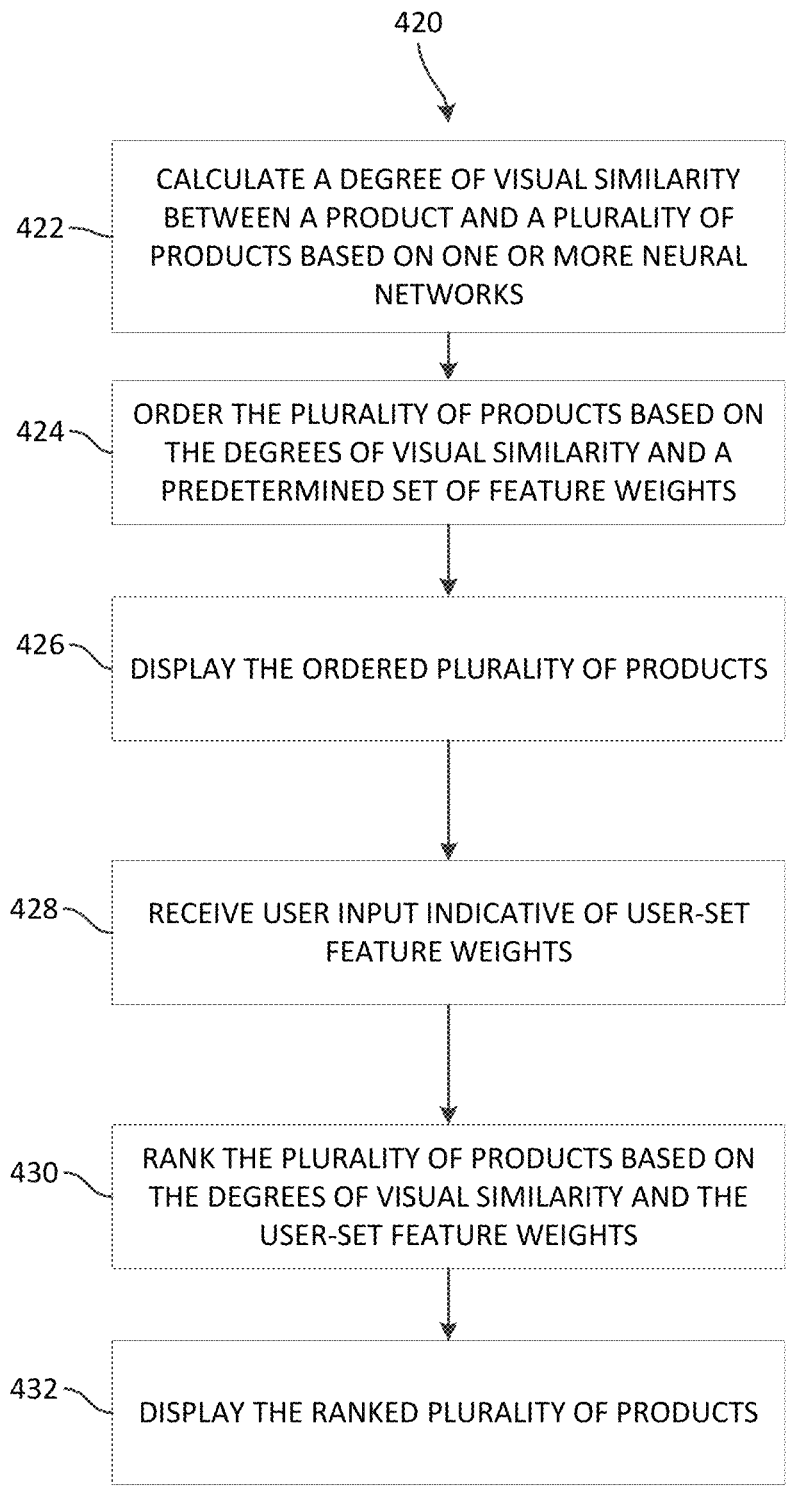
FIG. 4B is a flow chart illustrating an example method for ranking products based on user-designated feature weights.

FIG. 4B is a flow chart illustrating an example method 420 for ranking products based on user-designated feature weights. The method 420, or one or more portions thereof, may be performed by the product recommendation system 210 of FIG. 2, in some embodiments.

The method 420 may include a step 422 that includes calculating a degree of visual similarity between a product and a plurality of products based on one or more neural networks. The step 422 may involve the performance of one or more steps, such as the steps described above with respect to FIG. 4A, and/or involve the use of any of the techniques described herein with respect to determining visual similarity between images of products.

The method 420 may include a step 424 that includes ordering the plurality of products based on the degrees of visual similarity and a predetermined set of feature weights. In some examples, the predetermined set of feature weights may all be equal to 1, such that the plurality of products is sorted in order of the degrees of visual similarity without any character-specific weighting. In other examples, a predetermined set of feature weights—such as feature weights previously determined using optimization, previously designated by an expert or administrator, and/or otherwise determined prior to the execution of method 420—may each be applied relative to its respective feature value, to determine a set of weighted feature values. The weighted feature values may then serve as a basis for determining other metrics, such as distance metrics, which in turn may be used to order the plurality of products. At step 426, the method 420 may involve displaying the ordered plurality of products, such as on a web page or within an application executed on a computing device.

The method 420 may include a step 428 that includes receiving user input indicative of user-set feature weights. As described above, the user-set feature weights may be provided by a user as inputs or modifications to input elements on a web page, an application, or the like.

The method 420 may include a step 430 that includes ranking the plurality of products based on the degrees of visual similarity and the user-set feature weights. The user-set feature weights may differ from the predetermined set of feature weights, and may accordingly affect the visually similar rank order. After receiving user input indicative of the user-set feature weights, the method 420 may involve sorting, ranking, or otherwise modifying the plurality of products to update the order in which to display the plurality of products. At step 432, the method 420 may involve displaying the ranked plurality of products based on the user-set feature weights, such as on a web page or within an application executed on a computing device.

Figure 5:
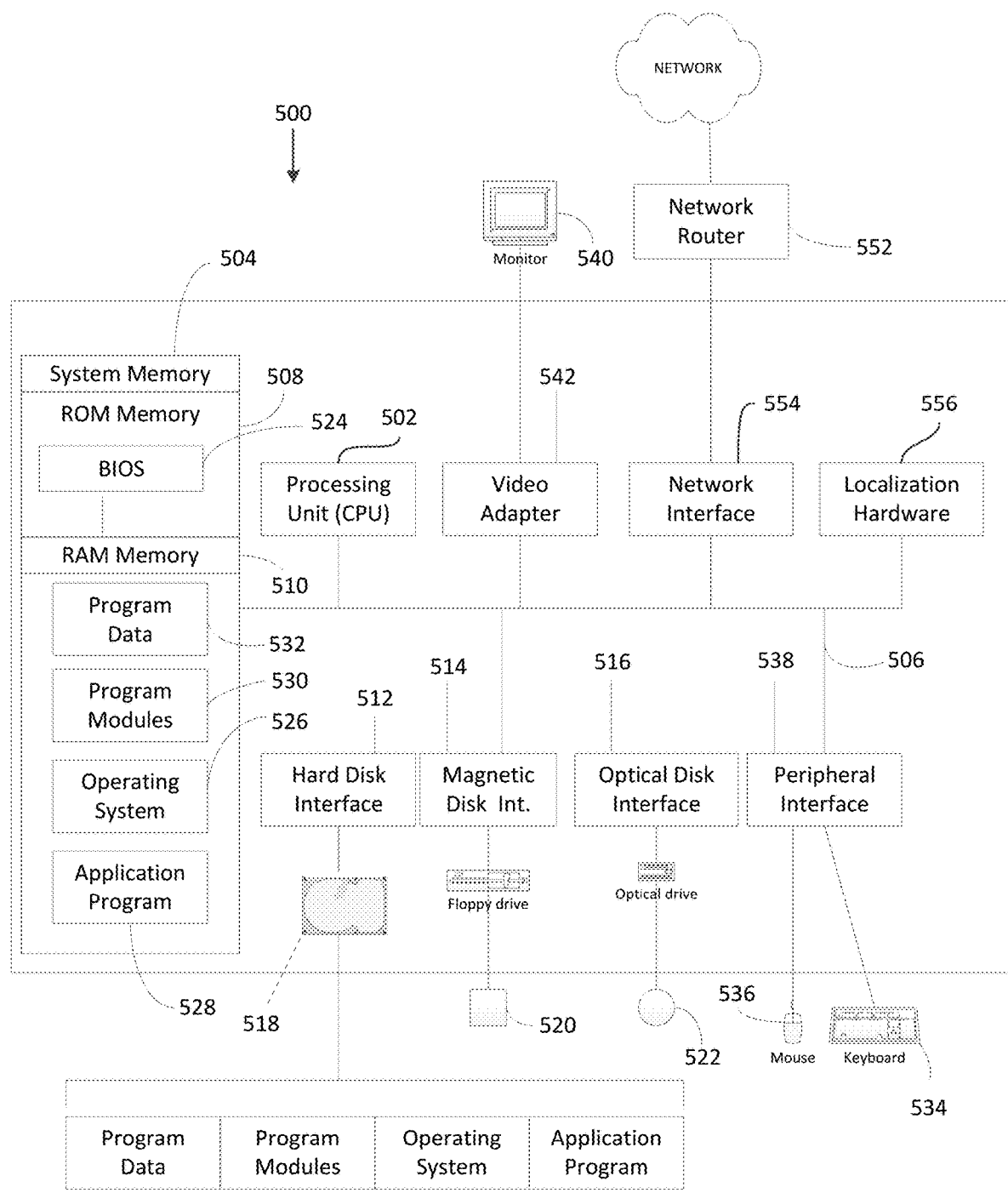
FIG. 5 is a diagrammatic view of an example user computing environment.

FIG. 5 is a diagrammatic view of an illustrative computing system that includes a computing system environment 500, such as a desktop computer, laptop, smartphone, tablet, or any other such device having the ability to execute instructions, such as those stored within a non-transient, computer-readable medium. Furthermore, while described and illustrated in the context of a single computing system 500, those skilled in the art will also appreciate that the various tasks described hereinafter may be practiced in a distributed environment having multiple computing systems 500 linked via a local or wide-area network in which the executable instructions may be associated with and/or executed by one or more of multiple computing systems 500.

Computing system environment 500 may include at least one processing unit 502 and at least one memory 504, which may be linked via a bus 506. Depending on the exact configuration and type of computing system environment, memory 504 may be volatile (such as RAM 510), non-volatile (such as ROM 508, flash memory, etc.) or some combination of the two. Computing system environment 500 may have additional features and/or functionality. For example, computing system environment 500 may also include additional storage (removable and/or non-removable) including, but not limited to, magnetic or optical disks, tape drives and/or flash drives. Such additional memory devices may be made accessible to the computing system environment 500 by means of, for example, a hard disk drive interface 512, a magnetic disk drive interface 514, and/or an optical disk drive interface 516. As will be understood, these devices, which would be linked to the system bus 506, respectively, allow for reading from and writing to a hard disk 518, reading from or writing to a removable magnetic disk 520, and/or for reading from or writing to a removable optical disk 522, such as a CD/DVD ROM or other optical media. The drive interfaces and their associated computer-readable media allow for the nonvolatile storage of computer readable instructions, data structures, program modules and other data for the computing system environment 500. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 500.

A number of program modules may be stored in one or more of the memory/media devices. For example, a basic input/output system (BIOS) 524, containing the basic routines that help to transfer information between elements within the computing system environment 500, such as during start-up, may be stored in ROM 508. Similarly, RAM 510, hard drive 518, and/or peripheral memory devices may be used to store computer executable instructions comprising an operating system 526, one or more applications programs 528 (such as one or more applications that execute the methods and processes of this disclosure), other program modules 530, and/or program data 532. Still further, computer-executable instructions may be downloaded to the computing environment 500 as needed, for example, via a network connection.

An end-user may enter commands and information into the computing system environment 500 through input devices such as a keyboard 534 and/or a pointing device 536. While not illustrated, other input devices may include a microphone, a joystick, a game pad, a scanner, etc. These and other input devices would typically be connected to the processing unit 502 by means of a peripheral interface 538 which, in turn, would be coupled to bus 506. Input devices may be directly or indirectly connected to processor 502 via interfaces such as, for example, a parallel port, game port, firewire, or a universal serial bus (USB). To view information from the computing system environment 500, a monitor 540 or other type of display device may also be connected to bus 506 via an interface, such as via video adapter 542. In addition to the monitor 540, the computing system environment 500 may also include other peripheral output devices, not shown, such as speakers and printers.

The computing system environment 500 may also utilize logical connections to one or more computing system environments. Communications between the computing system environment 500 and the remote computing system environment may be exchanged via a further processing device, such a network router 552, that is responsible for network routing. Communications with the network router 552 may be performed via a network interface component 554. Thus, within such a networked environment, e.g., the Internet, World Wide Web, LAN, or other like type of wired or wireless network, it will be appreciated that program modules depicted relative to the computing system environment 500, or portions thereof, may be stored in the memory storage device(s) of the computing system environment 500.

The computing system environment 500 may also include localization hardware 556 for determining a location of the computing system environment 500. In embodiments, the localization hardware 556 may include, for example only, a GPS antenna, an RFID chip or reader, a WiFi antenna, or other computing hardware that may be used to capture or transmit signals that may be used to determine the location of the computing system environment 500.

In embodiments, the computing system environment 500, or portions thereof, may comprise the repository of a product listing 202, the repository of product catalog 204, the repository of user information 206, the product recommendation system 210, and/or one or more user computing devices 220.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for determining image similarity, the method comprising:

determining, by a first neural network, a first feature value associated with a first characteristic of a first product based on an image of the first product;

determining, by a second neural network, a second feature value associated with a second characteristic of the first product based on the image of the first product;

calculating a first vector space distance between the first feature value and a third feature value associated with the first characteristic of a second product;

calculating a second vector space distance between the second feature value and a fourth feature value associated with the second characteristic of the second product;

determining a similarity value based on the first vector space distance and the second vector space distance; and based on the similarity value exceeding a threshold value, displaying, on a user interface, a representation of the first product in association with the second product.

2. The method of claim 1, wherein the representation of the first product is displayed in a first location within a list of products, the method further comprising:

receiving a feature weighting value associated with the first characteristic;

determining a first weighted vector space distance based at least in part on the first vector space distance and the feature weighting value; and calculating a weighted similarity value based on the first weighted vector space distance and the second vector space distance; and determining a second location within the list of products at which to display the first product, based at least in part on the weighted similarity value.

3. The method of claim 1, wherein the first neural network is independent from the second neural network.

4. The method of claim 1, further comprising:

determining, by the first neural network, the third feature value associated with the first characteristic of the second product based on an image of the second product; and determining, by the second neural network, the fourth feature value associated with the second characteristic of the second product based on the image of the second product.

5. The method of claim 1, wherein the second characteristic is substantially independent from the first characteristic.

6. The method of claim 1, wherein calculating the first vector space distance comprises:

calculating, as the first vector space distance, a cosine similarity value between the first feature value and the third feature value.

7. The method of claim 1, wherein calculating the first vector space distance comprises:

calculating, as the first vector space distance, a Euclidean distance between the first feature value and the third feature value.

8. The method of claim 1, wherein calculating the first vector space distance comprises:

calculating, as the first vector space distance, a Chebyshev distance between the first feature value and the third feature value.

9. The method of claim 1, wherein the first neural network is configured to extract one or more feature values representative of the first characteristic from input images.

10. The method of claim 1, wherein the second neural network is configured to extract one or more feature values representative of the second characteristic from input images.

11. The method of claim 1, further comprising:
determining, by a third neural network, a fifth feature value associated with a third characteristic of the first product based on the image of the first product.

12. The method of claim 1, wherein the first characteristic includes color information determinable based on an input image.

13. The method of claim 1, wherein the first characteristic includes shape information determinable based on an input image.

14. The method of claim 1, wherein the first characteristic includes pattern information determinable based on an input image.

15. The method of claim 1, wherein the first characteristic includes style information determinable based on an input image.

16. The method of claim 1, wherein the similarity value is a first similarity value, the method further comprising:
determining, by the first neural network, a fifth feature value associated with the first characteristic of a third product based on an image of the third product;
determining, by the second neural network, a sixth feature value associated with the second characteristic of the third product based on the image of the third product;
determining a third vector space distance between the third feature value associated with the second product and the fifth feature value associated with the third product;
determining a fourth vector space distance between the fourth feature value associated with the second product and the sixth feature value associated with the third product;
determining a second similarity value based on the third vector space distance and the fourth vector space distance; and
based on the second similarity value being greater than the first similarity value, displaying, on the user interface, a representation of products that are visually similar to the second product in descending order, in which the third product precedes the first product.

17. A computer-implemented method for determining image similarity, the method comprising:
determining, by a first feature extractor, a first feature value associated with a first characteristic of a first product based on an image of the first product;
determining, by a second feature extractor, a second feature value associated with a second characteristic of the first product based on the image of the first product;
determining a first weighted vector space distance based on the first feature value, a third feature value associated with the first characteristic of a second product, and a predetermined weighting value;
determining a second vector space distance based on the second feature value and a fourth feature value associated with the second characteristic of the second product;
determining a similarity value based on the first weighted vector space distance and the second vector space distance; and
based on the similarity value exceeding a threshold value, displaying, on a user interface, a representation of the second product in association with the first product.

18. The method of claim 17, wherein the representation of the first product is displayed in a first location within a list of products, the method further comprising:
receiving a user-specified feature weighting value associated with the first characteristic based on user input;
determining a third weighted vector space distance based at least in part on the first feature value, the user-specified feature weighting value, and the third feature value;
determining a user-specified weighted similarity value based on the third weighted vector space distance and the second feature value vector; and
determining a second location within the list of products at which to display the first product, based at least in part on the user-specified weighted similarity value.

19. The method of claim 17, wherein the first feature extractor is a convolutional neural network.

20. A system for determining visual similarity between images of products, the system comprising:
a processor; and
a non-transitory, computer-readable memory storing instructions that, when executed by the processor, cause the processor to perform a method comprising:
determining, by a first neural network, a first feature value associated with a first characteristic of a first product based on an image of the first product;
determining, by a second neural network, a second feature value associated with a second characteristic of the first product based on the image of the first product;
calculating a first vector space distance between the first feature value and a third feature value associated with the first characteristic of a second product;
calculating a second vector space distance between the second feature value and a fourth feature value associated with the second characteristic of the second product;
determining a similarity value based on the first vector space distance and the second vector space distance;
determining that the first product and the second product are both associated with a product category based on the similarity value; and
storing an indication that the first product is associated with the product category in a storage device.

* * * * *